United States Patent
McCormack et al.

(10) Patent No.: US 9,635,061 B2
(45) Date of Patent: Apr. 25, 2017

(54) SYSTEM AND METHOD FOR MANAGING CONFERENCE CALLS

(71) Applicant: Avaya Inc., Basking Ridge, NJ (US)

(72) Inventors: Tony McCormack, Galway (IE); Desmond Kirrane, Co. Galway (IE); Paul D'Arcy, Limerick (IE)

(73) Assignee: Avaya Inc., Basking Ridge, NJ (US)

( * ) Notice: Subject to any disclaimer, the term of this patent is extended or adjusted under 35 U.S.C. 154(b) by 486 days.

(21) Appl. No.: 13/849,516

(22) Filed: Mar. 24, 2013

(65) Prior Publication Data
US 2014/0289326 A1    Sep. 25, 2014

(51) Int. Cl.
*G06F 15/16* (2006.01)
*H04L 29/06* (2006.01)

(52) U.S. Cl.
CPC ...... *H04L 65/1006* (2013.01); *H04L 65/1009* (2013.01); *H04L 65/1069* (2013.01); *H04L 65/1093* (2013.01); *H04L 65/4038* (2013.01)

(58) Field of Classification Search
CPC ............. H04L 12/1818; H04L 12/1822; H04L 65/403; H04L 65/1006; H04L 65/1069; H04L 65/1009; H04L 65/4038; H04L 65/1093; H04M 3/56; H04M 3/567
See application file for complete search history.

(56) References Cited

U.S. PATENT DOCUMENTS

| | | | |
|---|---|---|---|
| 2004/0161090 A1* | 8/2004 | Digate et al. | 379/202.01 |
| 2007/0133438 A1* | 6/2007 | Shaffer | H04L 12/1813 370/260 |
| 2007/0208806 A1* | 9/2007 | Mordecai et al. | 709/204 |
| 2008/0159179 A1* | 7/2008 | Shaffer | H04L 12/1818 370/261 |
| 2008/0298278 A1* | 12/2008 | Thakkar | H04M 3/567 370/260 |
| 2009/0124349 A1* | 5/2009 | Dawson et al. | 463/24 |
| 2011/0141951 A1* | 6/2011 | Ramachandran et al. | 370/263 |
| 2011/0267987 A1* | 11/2011 | Asthana | H04L 12/18 370/260 |
| 2011/0271212 A1* | 11/2011 | Jones et al. | 715/753 |
| 2012/0262533 A1* | 10/2012 | Gannu | H04M 3/567 348/14.07 |
| 2013/0290870 A1* | 10/2013 | Jones | H04L 65/403 715/753 |
| 2013/0298040 A1* | 11/2013 | Jones | H04L 65/403 715/753 |

* cited by examiner

Primary Examiner — Krisna Lim (57) ABSTRACT

A conference handling system for an enterprise is provided. The conference handling system includes a status determining module for determining a status of a conference bridge. The conference handling system further includes a conferee routing module for routing a conferee into a session comprising an active session and a waiting session, based on the status of the conference bridge, the conferee routing module further determining a contextual status of the active session. The conference handling system further includes a conferee serving module for providing services to the conferee into the waiting session based on the contextual status of the active session. The conference handling system further includes a conferee inviting module for adding additional conferees with a specific profile in the waiting session and the active session based on absence of a conferee having a similar profile.

20 Claims, 5 Drawing Sheets

SYSTEM AND METHOD FOR MANAGING CONFERENCE CALLS

BACKGROUND

Field of the Invention

Embodiments of the present invention provide a system and a method for managing conference sessions. More particularly, embodiments of the present invention provide a system and a method for providing services to waiting conferees.

Description of Related Art

Conference applications typically permit multiple conferees to join a single conference. More recently, conference sessions have included combinations of various kinds of media such as audio, video, text, and computer graphics. Thereafter, it became well known for individuals to communicate information by having a group of conferees within a conference.

Presently, there are numerous and diverse computer application programs for scheduling a conference session, reminding conferees of an upcoming conference session, controlling access of conferees to the conference session, and adding or removing various media streams to the conference session. The computer application programs range from rather simple client conferencing programs residing on a conferee's smart phone or portable computer, to rather complex programs residing on a server at an Internet site of a conference application service provider. This has resulted in proliferation of the conferencing services with diverse features and levels of complexity, which has further raised challenges of inter-operability among conference devices, such as a conference bridge.

Moreover, as more and more people started leveraging the potential of the conference services, various management issues have emerged. One of such issue arises in cases where a single conference bridge is shared among a plurality of conferees for making back-to-back sessions on the conference bridge. Sometimes, even two consecutively scheduled conference calls override each other due to overrunning of an earlier scheduled conference call. This typically results in conferees joining meetings they were not invited to, which further leads to security concerns in case of confidential conference calls.

Handling such clashing meetings due to conference session overruns typically requires the moderator to react once they occur, or once it is realized that a meeting is likely to overrun. The moderator needs to be aware of such event and react by either postponing or cancelling clashing meetings or by reducing scope of meetings by adhering to a more restrictive agenda. This requires manual intervention by the moderator of the conference, which is a time consuming process.

Further, sometimes, when conferees dial a conference bridge, they find the conference bridge busy due to over-running of earlier calls. So, the conferees have to wait, thereby wasting some of their valuable time. Furthermore, the waiting conferees do not know how long they need to wait as they do not know when the overrunning call will end. This is further frustrating for them.

Therefore, there is a need for a system and method for managing conference sessions and conferees to ensure secure, seamless, and uninterrupted experiences in a conference session.

SUMMARY

Embodiments in accordance with the present invention provide a conference handling system for an enterprise. In an embodiment, the conference handling system may be present within the enterprise. In another embodiment, the conference handling system may be a cloud based system that can be approached by various enterprises over Internet. The conference handling system includes a status determining module for determining a status of a conference bridge. The conference handling system further includes a conferee routing module for routing a conferee into a session comprising an active session and a waiting session, based on the status of the conference bridge, the conferee routing module further determining a contextual status of the active session. The conference handling system further includes a conferee serving module for providing services to the conferee into the waiting session based on the contextual status of the active session. The conference handling system further includes a conferee inviting module for adding additional conferees with a specific profile in the waiting session and the active session based on absence of a conferee having a similar profile.

Embodiments in accordance with the present invention further provide a computer-implemented method for providing services to waiting conferees in a conference session. The computer-implemented method includes receiving a request from a conferee to join a conference, routing the conferee into a session comprising an active session and a waiting session, based on a status of the conference session, determining a contextual status of the active session, and providing services to the conferee into the waiting session based on the contextual status of the active session.

Embodiments in accordance with the present invention further provide a computer readable medium storing computer readable instructions when executed by a processor performs a method. The method includes receiving a request from a conferee to join a conference session, routing the conferee into a session comprising an active session and a waiting session, based on a status of the conference session, determining a contextual status of the active session, and providing services to the conferee into the waiting session based on the contextual status of the active session.

Further, embodiments of the present invention can provide a number of advantages depending on its particular configuration. Embodiments of the present invention provide a system and a method to allow moderators of conference bridges to exact more control of a conference service. It enable the moderators to control access to a conference bridge by using contextual aware technology to place conferees in a waiting area when they join a call ahead of a previous meeting's completion, in addition to being able to receive awareness updates regarding the current status of a conference. It also provides a mechanism whereby the individual conferences have a presence that can be acted upon by individuals and applications.

Furthermore, embodiments of the present invention solve a frequent problem wherein back-to-back meetings conferees in later calls join a meeting that overruns and end up joining a private or confidential meeting. This is solved by routing the conferees into a separate waiting session that can be restored at the end of the running session. Additionally, embodiments of the present invention allow conferees to automatically join for particular segments of a conference based on contextual status of the conference.

Further, embodiments of the present invention provide utilizing waiting time of the waiting conferees by providing services during the waiting time, for example, providing advertisements, playing music, playing pre-recorded announcements, providing overrun alerts corresponding to the active session, and providing details to the conferee corresponding to estimated time left in completion of the active conference session. Embodiments of the present invention further provide an intelligent conferencing system that can automatically add additional conferees with a specific profile in the active session or waiting session based on absence of a conferee having a similar profile.

These and other advantages will be apparent from the disclosure of the present invention contained herein.

The preceding is a simplified summary of the present invention to provide an understanding of some aspects of the present invention. This summary is neither an extensive nor exhaustive overview of the present invention and its various embodiments. It is intended neither to identify key or critical elements of the present invention nor to delineate the scope of the present invention but to present selected concepts of the present invention in a simplified form as an introduction to the more detailed description presented below. As will be appreciated, other embodiments of the present invention are possible utilizing, alone or in combination, one or more of the features set forth above or described in detail below.

BRIEF DESCRIPTION OF THE DRAWINGS

The above and still further features and advantages of the present invention will become apparent upon consideration of the following detailed description of embodiments thereof, especially when taken in conjunction with the accompanying drawings, and wherein.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including but not limited to. To facilitate understanding, like reference numerals have been used, where possible, to designate like elements common to the figures.

DETAILED DESCRIPTION

The present invention will be illustrated below in conjunction with an exemplary communication system, e.g., a conference bridge. Although well suited for use with, e.g., a system having conference call capability or other similar contact processing switch, the present invention is not limited to any particular type of communication system switch or configuration of system elements. Those skilled in the art will recognize the disclosed techniques may be used in any communication application in which it is desirable to provide improved contact processing.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted the terms "comprising", "including", and "having" can be used interchangeably.

The term "conferee" and variations thereof, as used herein, refers to a person who accessed/will access a conference bridge. Further the term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read.

A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the present invention is considered to include a tangible storage medium or distribution medium and prior art-recognized equivalents and successor media, in which the software implementations of the present invention are stored.

The terms "determine", "calculate" and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the present invention is described in terms of exemplary embodiments, it should be appreciated those individual aspects of the present invention can be separately claimed.

The term "switch" or "server" as used herein should be understood to include a PBX, an ACD, an enterprise switch, or other type of communications system switch or server, as well as other types of processor-based communication control devices such as media servers, computers, adjuncts, etc.

Figure 1:
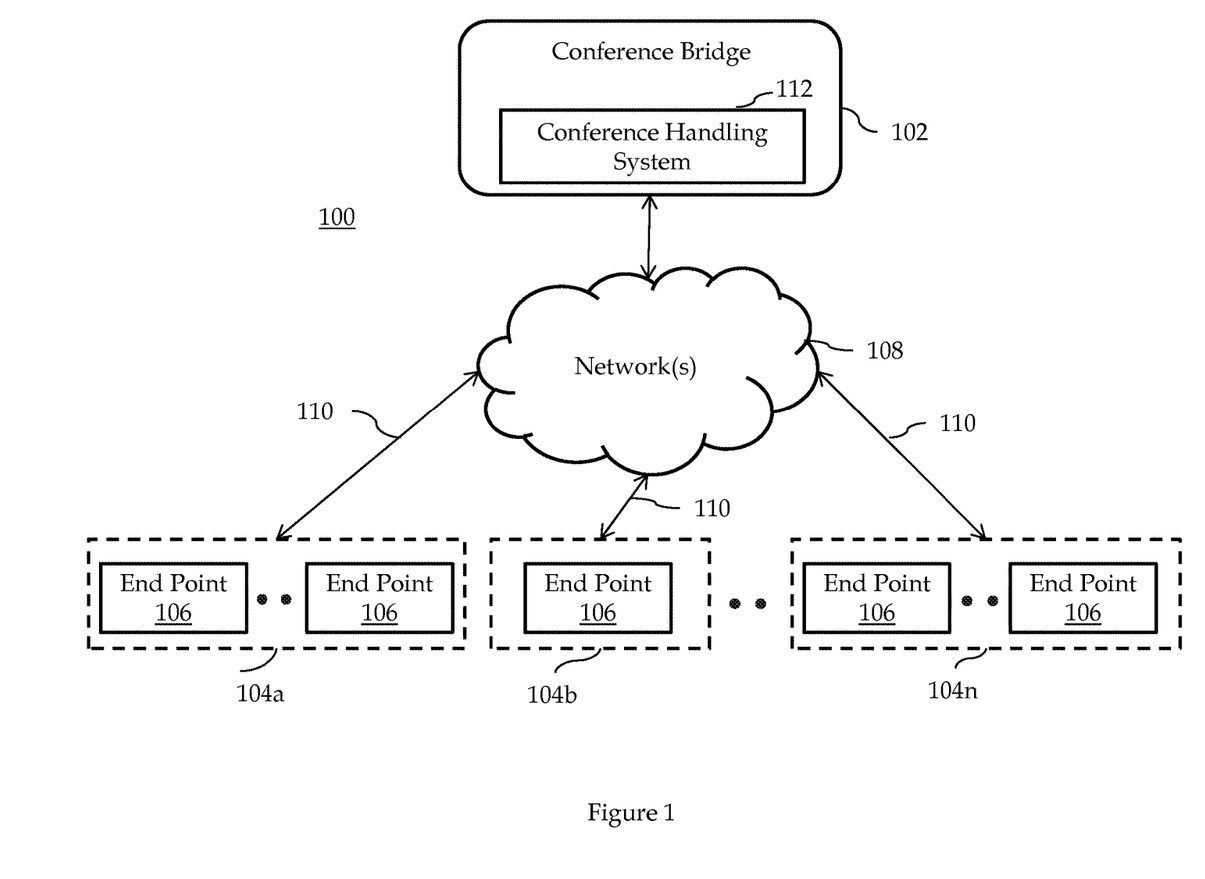
FIG. 1 illustrates an exemplary environment where various embodiments of the present invention are implemented.

FIG. 1 illustrates an exemplary environment 100 where various embodiments of the present invention are implemented. As shown, the environment 100 includes a conference bridge 102 and sites 104a-n. Sites 104a-n include endpoints 106 that are connected to the conference bridge 102 via one or more network(s) 108. Examples of the network(s) 108 include, but are not limited to, a Local Area Network (LAN), a Wide Area Network (WAN), the Internet, Public Switched Telephone Network (PSTN), or other communication networks. In an embodiment, the conference bridge may be present within an enterprise. In another embodiment, the conference bridge may be present on a central server (not shown) that may act as a cloud server for providing conference services to various enterprises the network 108.

In accordance with various embodiments, the conference bridge 102, network(s) 108, and endpoints 106 are Session Initiation Protocol (SIP) compatible and may include interfaces for various other protocols such as H.248, H.323, ISDN, E1/T1, and analog line or trunk. Examples of endpoints 106 include, but are not limited to, communications device, such as a telephone, speakerphone, cellular phone, SIP-enabled endpoint, soft phone, tablet, wired or wireless communication device, video conferencing hardware/software, or in general any communications device that is capable of sending and/or receiving communications. In addition, the endpoint 106 may further include devices capable of communicating over network by using protocols such as TCP, IGMP, ICMP, or WebRTC etc.

Conferees of conference calls use endpoints 106 to join a video or audio conference. In an embodiment, each endpoint 106 may be used by one or more conferees. As shown, endpoints 106 may be available at sites 104a-n. In various embodiments, sites 104a-n may be distributed geographically or logically so as to use same or different communication links 110 with the conference bridge 102 or among the endpoints 106. Further, it will be appreciated by a person skilled in the art that a conference call is not limited to a telephony conference call and includes multimedia conference sessions, which further includes, but is not limited to, audio, video, web, and chatting channels.

Moreover, the conference bridge 102 handles basic conference functionality such as setup, management, billing and termination. Cooperating with the conference bridge 102 is a conference handling system 112. The conference handling system 112 provides the functionality of handling conference calls among endpoints 106, in accordance with embodiments of the present invention. In various embodiments, the conference handling system 112 may be implemented as hardware or a processor, software or computer instructions, firmware, or one or more combination of these. Although not shown, a person skilled in the art will appreciate that conference bridge 102 may include other components such as processor(s) and memory that may be required for the operation of the present invention.

Conferees may join a conference call before a scheduled start time and leave the call after a scheduled end time. Another conference call may also be scheduled to start at the scheduled end time of the ongoing conference. Therefore, the actual call times of the ongoing conference may overlap the start or end time of the other scheduled conferences. This may result in conferees of later calls joining a meeting that overruns, or in worse scenario, callers may end up joining a private or confidential meeting.

In accordance with an embodiment of present invention, the conference handling system 112 automatically enable conferees of a later call to receive presence updates corresponding to an already running conference. The presence update may inform the conferees corresponding to current state of the running conference, and in an advance embodiment may also inform corresponding to estimated time left for the running conference to end.

In accordance with another embodiment of the present invention, the conference handling system 112 supports moderator of the conference session by automatically adding additional conferees for specific segments of the running conference (based on the presence status of the running conference). In addition, the conference handling system 112 supports the moderator of the conference session by adding conferees with specific profiles to the conference (in absence of preferred conferees).

In accordance with yet another embodiment of the present invention, the conference handling system 112 provides various services to the conferees of a later call (based on estimated wait time in completion of running call). The services may include, but are not limited to, music, call overrun alerts, pre-recorded announcements, automatic routing of conferees of the later call into a separate conference call, where the conferees may wait for the running conference to end and can even communicate with other conferees (who are also waiting). Further, the conferees waiting in the separate conference call are automatically added into the main conference call as soon as the running conference call ends and the conference bridge 102 gets free to handle new calls. An exemplary scenario of the conference handling system is explained further in conjunction with the FIG. 2 of the present invention.

Figure 2:
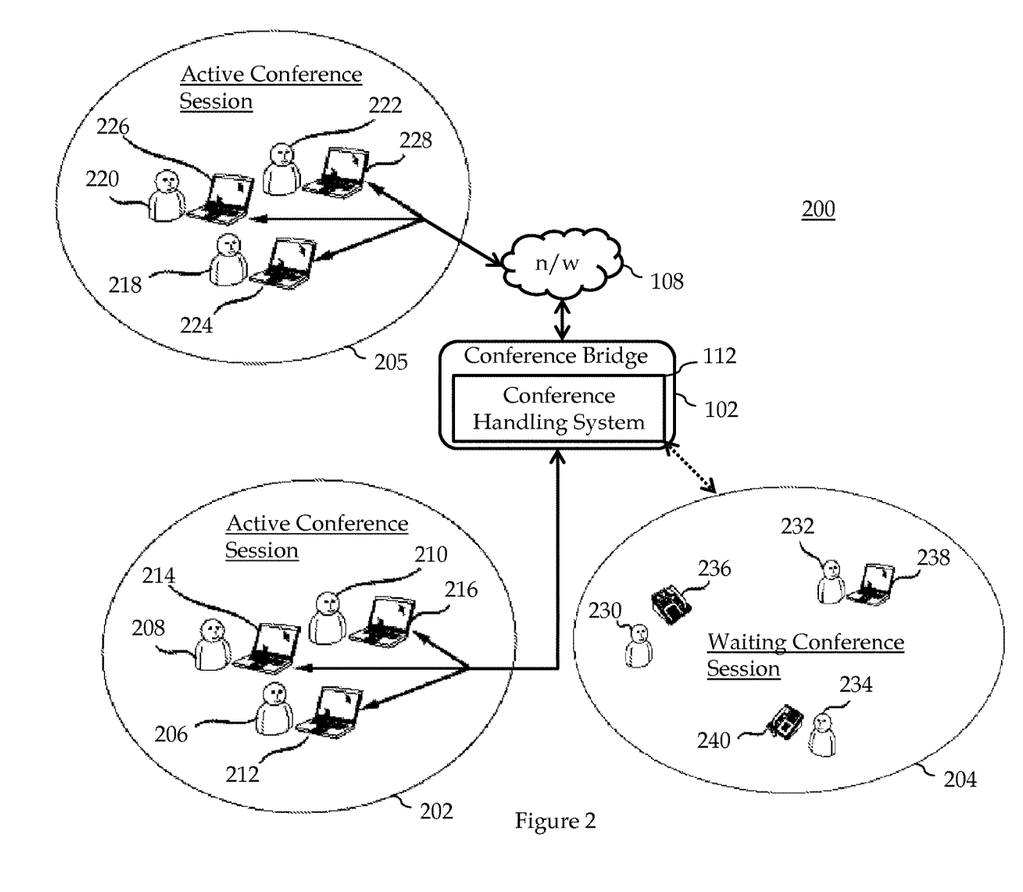
FIG. 2 is an exemplary environment illustrating implementation of the conference handling system, in accordance with an embodiment of the present invention.

FIG. 2 is an exemplary environment 200 illustrating implementation of the conference handling system 112, in accordance with an embodiment of the present invention. The exemplary embodiment 200 illustrates a scenario where an enterprise (not shown) possesses a conference bridge, such as the conference bridge 102, which is shared between its various users. Therefore, the conference bridge 102 may be pre-scheduled, with back-to-back conferences by the various users. Generally, all conference calls do not end at their scheduled time, which may lead to call overrun. Overrunning calls may create inconvenience for the consecutively scheduled calls (that is scheduled after).

Moreover, the conferees of the consecutively scheduled conference call may not be aware the conference bridge 102 is still occupied by the overrunning call and may start connecting with the conference bridge 102 at their scheduled time. This may cause inconvenience to the conferees of the overrunning call and may also be a security concern for the confidentiality of the overrunning call. To overcome such issues, the present invention proposes use of the conference handling system 112 that is capable of preventing the conferees of the later call to join the conference bridge 102 until the running call gets over.

As shown in FIG. 2, various conferees of the enterprise are connected with the conference bridge 102 in two different conference sessions i.e., active conference session 202 and waiting conference session 204. The active conference session 202 is in communication with another active conference session 205, which is external to the enterprise and is connected via the network 108 with the help of the conference bridge 102. Further, as shown the waiting conference session 204 is in communication with the conference bridge 102 and is not in a communication session with 205.

Further, as shown in session 202 and 205, active conferees 206, 208, and 210 of the session 202 are in communication with the conference bridge 102 by using their conference devices 212, 214, and 216, respectively. The conference bridge 102 is further in communication with the active conferees 218, 220, 222 via their conference devices 224, 226, and 228, respectively. Furthermore, the passive conferees 230, 232, and 234 are in passive communication with the conference bridge 102 via their conference devices 236, 238, and 240.

In an embodiment, the conference bridge 102 may be configured to connect the conferees of the enterprise with the conferees outside the enterprise. Further, the conference handling system 112 may be configured to authenticate every conferee that logs into the conference bridge 102. Furthermore, the conference handling system 112 may be pre-provided with a scheduled list of conferees invited for various pre-scheduled conference calls.

Based on log in credentials provided by a call conferee, the conference handling system 112 may determine whether the call conferee is meant for joining a currently running conference call (active conference) or is meant to join that is scheduled after the currently running call. In one case, if the conferee is meant to join the currently running call, then the conference handling system 112 may allow the conferee to join the call (in the active conference session 202) and may inform the other conferees of the active conference session 202 corresponding to the newly joined conferee.

In other cases, if the conferee is meant to join a call that is scheduled next to the currently running call, then the conference handling system 112 may restrict the access of the conferee to the active conference session 202. Further, the conference handling system 112 may inform the conferee the call for which the conferee has logged is not started yet because of an overrunning conference call. Furthermore, the conference handling system 112 may route the conferee in a waiting conference session 204 (which is separate from the active call session) where the conferee may be provided with certain media resources, such as, but not restricted to, music, call overrun alerts, pre-recorded announcements, automatic routing of conferees of the later call into a separate conference call, where the conferees may wait for the running conference to end and can even communicate with other conferees (who are also waiting).

Additionally, the conference handling system 112 is configured to determine "presence status" of the conference bridge 102 or of the active conference (between session 202 and 205). A presence status of a conference bridge 102 may be one of, but not restricted to, ready/not ready, busy/available, or active/passive. Based on the presence status of the conference bridge 102, the conference handling system 112 may restrict the access of the conferees to join the active conference. In an embodiment, the conference handling system 112 may use Avaya's Aura Experience Manager Technology to regulate access of conferees in the active conference based on the presence status of the conference bridge 102.

In addition, the conference handling system 112 may be configured to automatically assign a more advanced presence status to the active conference by combining usage of Avaya context services and Aurix technology. The presence status may identify running status of the active conference, such as, but is not limited to, ready, not ready, wrapping up, just started, on-hold, or expected remaining time for the active conference to end.

Further, the conference handling system 112 may be configured to provide conference control services to the moderator of the conference bridge 102 for enabling the moderator to set status of the conference bridge 102 and to perform other bridge management activities, such as but not restricted to, specifying estimated wait time, managing waiting areas (sessions), and managing media resources for conferees waiting in waiting sessions. In an embodiment, the conference handling system 112 may further avail presence status of active conference, whether it is set manually (e.g., by the conference moderator using a user interface, such as desktop, mobile app, or simple telephone keypad controls) or derived automatically, through, for example, analysis of the conference media, using Avaya Aurix technology.

In an exemplary embodiment of the present invention, if an active conference (such as active conference between session 202 and 205) overruns on the conference bridge 102, then the moderator of the conference bridge 102 may set its status as 'not ready' (manually) with estimated wait time via a conference control UI (that may be provided by the conference handling system 112). In an embodiment, the conference handling system 112 may automatically set the status of the bridge 102 with the estimated wait time. Thereafter, if any conferees try to join the conference bridge 102, then they may be placed in the waiting conference session 204 by the conference handling system 112. Further, conferees in the waiting area may receive wait treatment based on the estimated wait time.

For example, the conferees in the waiting conference session 204 may hear music, receive overrun alerts, pre-recorded announcements, or be placed in a second conference acting as a waiting room to allow meeting attendees to communicate. Furthermore, at the completion of the active conference, the moderator may manually change the status of the conference bridge 102 as 'ready'. In an embodiment, the conference handling system 112 may automatically change the status of the conference bridge 102 as soon as the active conference ends. Thereafter, the conference handling system 112 may allow the conferees from the waiting conference session 204 to access the conference bridge 102 in order to connect with desired group of people outside the enterprise.

Figure 3:
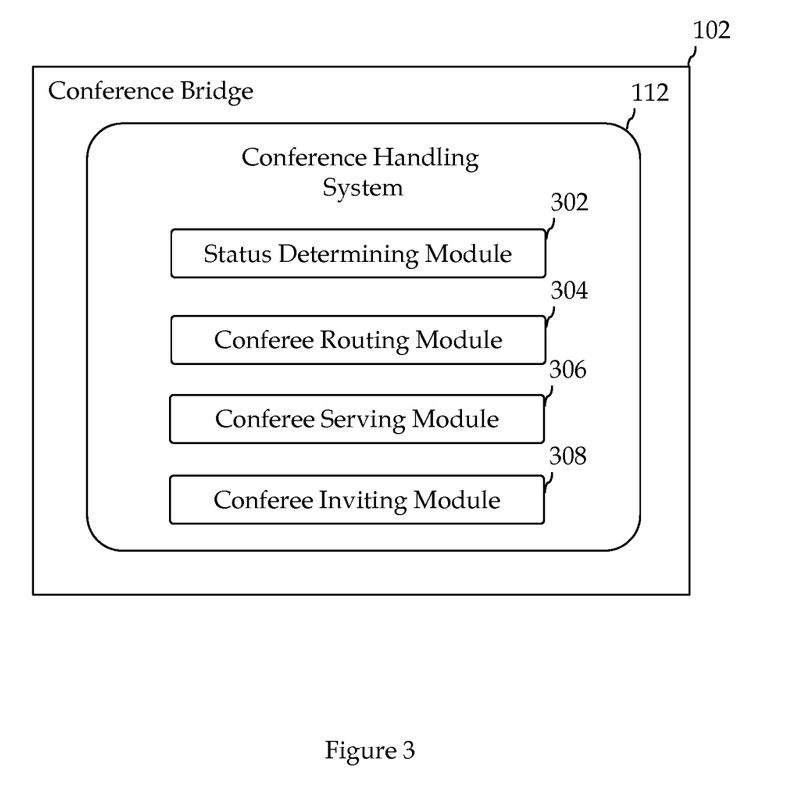
FIG. 3 is an exemplary block diagram of the conference bridge possessing a conference handling system for preventing unwanted users of an enterprise to join a confidential conference call, in accordance with an embodiment of the present invention.

FIG. 3 is an exemplary block diagram of the conference bridge 102 possessing a conference handling system 112 for preventing unwanted users of an enterprise to join a confidential conference call, in accordance with an embodiment of the present invention. As shown, the conference handling system 112 possesses a plurality of modules, such as status determining module 302, conferee routing module 304, conferee serving module 306, and conferee inviting module 308.

In an embodiment, the status determining module 302 may be configured to use Avaya context services and Aurix technology to automatically set presence state/status of a conference session. Further, the status determining module 302 may use natural language processing engine (or other speech recognition tools) to determine presence status of the conference session. To use a simple example, five second pause may be interpreted as end of the conference call.

In an embodiment, the status determining module 302 may use the pre-scheduled start and end time information of the conference call to determine presence status of the conference call. In another embodiment, the status determining module 302 may be configured to determine presence state/status of the conference bridge 102 based on the usage of the conference bridge 102. For example, if the conference bridge 102 is already occupied or is busy or not.

Furthermore, the status determining module 302 may use inputs of moderator of the conference bridge 102 to determine the presence status of the conference bridge 102. The status determining module 302 may then forward the determined information to the conferee routing module 304. In an embodiment, the status determining module 302 may be configured to alert conferees of the conference calls in case any conferee enter or leaves the conference or in case if the conference scheduled time is about to end.

The conferee routing module 304 may be configured to authenticate all users who try to connect with the conference bridge 102. Authentication may involve analysis of the log in credentials used by the user to connect with the conference bridge 102. Moreover, the conferee routing module 304 may be configured to use the log in credentials or identity of the conferee for determining if the user was invited to join the currently ongoing conference call (active session) or a conference call that is scheduled afterwards. Based on the identity of the conferee, the conferee routing module 304 may rout the conferee either into the active session or the waiting session. In one case, if the user was invited in the active session, then the conferee routing module 304 may route the user in the active session. In other cases, if the user was not invited for the active session, then the conferee routing module 304 may restrict the user to access the conference bridge 102. In an embodiment, the conferee routing module 304 may use Avaya's Aura Experience Manager Technology to regulate access of the user based on the status of the bridge 102 or status of the ongoing/active conference call that is determined by the status determining module 302.

Further, the conferee routing module 304 may be configured to route the conferee (who has logged in to participate in a call that is scheduled after the ongoing call) into a waiting session (such as waiting conference session 204), where the conferee may be served with various media resources, by the conferee serving module 306, in the duration for which the conferee waits for his/her turn to initiate his/her scheduled conference call. In another embodiment, based on the status of the conference bridge 102, the conferee routing module further determines a contextual status of the active session.

The services provided by the conferee serving module 306 may include media resources, such as but are not limited to, enabling the conferee to lease desired music and playing desired music of the conferee, sending overrun information/alerts corresponding to the overrunning call, playing pre-recorded announcements, showing advertisements, providing details to the conferee corresponding to estimated time left in completion of an active conference session, or placing the conferee in a secondary conference session where other conferees who are also waiting to join scheduled session are present (or will be added). The media resources further includes web and mobile content. In an embodiment, the conferee serving module may provide services to the conferee into the waiting session based on the contextual status of the active session. The conferees may then communicate with each other to discuss their preparation internally before joining the actual call with the destined people.

The conferee inviting module 308 may be configured to receive information from all of the aforementioned modules to determine if all invited people have joined the active conference call or not. In one case, if the conferee inviting module 308 determines that one or more invited people have not joined the active conference session, then the conferee inviting module 308 may determine the role of the missing person in the active conference from the call invitation that was sent prior to the call.

Based on the determined role, the conferee inviting module 308 may search its database to determine another person of similar role and may send an invite to quickly join the active conference. For example, if in a conference call an invited advocate is missing, then the conferee inviting module 308 may automatically send an invite to another advocate (information about whom may be present in the database) to join the active conference. Further, the conferee inviting module 308 may avail 'Avaya Experience Manager' technology to select the most appropriate human resource in the enterprise to cover the role needed by the conference.

Similarly, the conferee inviting module 308 may also be configured to analyze from the conferees waiting in the secondary conference call, whether or not all required conferees have joined, based on the status of the ongoing call. For example, if scheduled start time of a call is 1:15 pm and a previous call is still running till 1:20 pm, then the conferee inviting module 308 may check if all invited people for the scheduled call are already present in the waiting conference or not. If not, then the conferee inviting module 308 may send and invite to the missing person along with an invite to replacement of that person.

In an exemplary embodiment, the conferee inviting module 308 is configured to add additional conferees with a specific profile in the waiting session if a conferee having a similar profile is absent. Further, the conferee inviting module adds additional conferees with a specific profile in the active session based on absence of a conferee having a similar profile. In an embodiment, the conferee inviting module waits a pre-determined time before adding the conferee to the waiting session.

Further, in an embodiment, the conferee inviting module 308 may be configured to invite people in the conference only in certain segments of the conference. For example, if a conference is on agenda of sales of an enterprise. Then, the conferee inviting module 308 may be configured to invite people from the enterprise based on presence status of the call, such as if presence status of the call is 'discussion on sales of product 'x', then the conferee inviting module 308 may invite all the designated employees of the enterprise who are related to the sales of product 'x'.

Figure 4A:
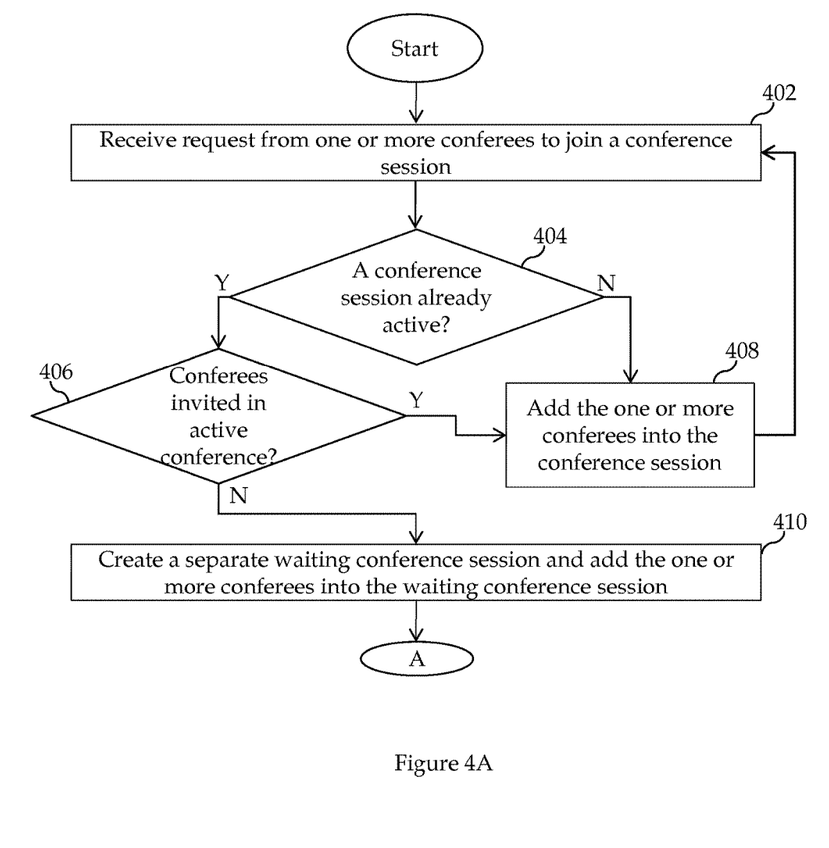
FIGS. 4A and 4B illustrate a method for routing undesignated conferees of an active conference call into a waiting session, in accordance with an embodiment of the present invention.
Figure 4B:
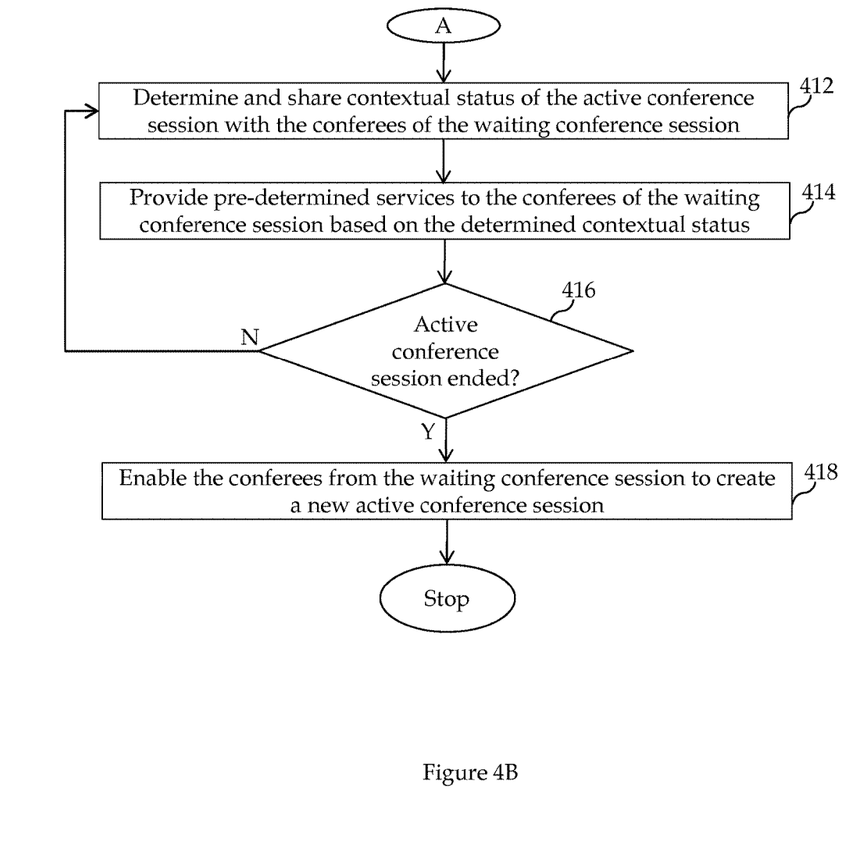

FIGS. 4A and 4B illustrate a method for routing undesignated conferees of an active conference call into a secondary conference call session, in accordance with an embodiment of the present invention. At step 402, a conference handling system of a conference bridge may receive requests from one or more conferees to join a conference session. At step 404, the conference handling system may determine if the conference bridge is already busy with another conference call or not. If the conference handling system determines the conference bridge is busy, then the method may proceed to step 406. Otherwise, the method may proceed to step 408.

At step 406, the conference handling system may determine if the conferees are designated to attend the active conference call or a call scheduled after the active call. If the conferees are designated to attend the active conference call, then the method may proceed to step 408. Otherwise the method may proceed to step 410. At step 408, the conference handling system may add the conferees into the active communication call.

At step 410, the conference handling system may restrict the access of the conferees to join the active communication call and may create a separate communication session where the conferees may wait until (and communicate with each other) the active conference call gets over. Further, at step 412, the conference handling system may determine contextual status of the active conference session. The contextual status of the active conference session may include, but is not limited to, 'ready', 'not ready', 'wrapping up', 'just started', 'over' etc. Furthermore, the conference handling system may share the contextual status with the conferees waiting in the waiting conference session in order to keep them informed about the status of ongoing call.

In an embodiment, based on the determined contextual status of the active conference session, the conferees may be provided with certain media resources at step 414. The media resources may include, but is not limited to, enabling the conferee to lease desired music and playing desired music of the conferee, sending overrun information/alerts corresponding to the overrunning call, playing pre-recorded announcements, showing advertisements, providing details to the conferee corresponding to estimated time left in completion of an active conference session, or placing the conferee in a secondary conference session where other conferees who are also waiting to join scheduled session are present (or will be added). The media resources further includes web content and mobile content. For example, the conferees may be provided with certain web content that may be relevant as per agenda of their conference or may be requested by the conferees. In an embodiment, the web content may be generic and may include certain guidelines.

For example, if the contextual status of the active conference session concludes the active conference session will take some time to end, then the conference handling system may enable the conferees present in the waiting conference session to communicate with each other. In another example, if the contextual status of the active conference session concludes that the active conference session is going to end soon, then the conference handling system may provide certain short advertisements to the conferee added in the waiting conference session.

Further, at step 416, the conference handling system may determine from the contextual status of the active call whether or not the active call ended. If the call did not end then the conference handling system may repeat the step 412 until the active call ends. Furthermore, if the active call ends, then at step 418, the conference handling system may enable the conferees from the waiting conference session to create a new active conference session.

Further, the conference handling system may intelligently add people (that were not originally invited) to the conference that is about to occur or is occurring, based on contextual status of the active conference call. For example, if, in a meeting, a president of an enterprise is invited and the president did not log in to the conference session on time, then the conference handling system may intelligently send an invite to the vise-president of the company (if not already invited) to join the conference.

Example

An example will now be discussed to illustrate the above principles. The following example illustrates working of the present invention in accordance with an embodiment of the present invention. A person of ordinary skilled in the art will appreciate the present invention may be performed within any enterprise and is not limited to any particular enterprise or communication framework of the enterprise.

In an enterprise, a group of people may initiate a conference call with some person from another country on a legal matter. As soon as the call begins, the status of the conference bridge may become 'busy'. This may prevent other people of the company to access the conference bridge. Further, based on the discussions of the conferees, a conference handling system of the conference bridge may determine contextual status of the call such as, 'meeting just began' or 'meeting about to end,' etc. Based on the contextual status, the conference handling system may determine whether to keep a person on hold who is waiting to join in the next conference call or not. For example, if in a conference someone says 'let us wrap up the meeting in 5 minutes', then the conference handling system may update the contextual status as 'meeting is expected to end in 5 minutes'. Further, based on the wait duration, the system may either place a waiting conferee in a secondary conference call where all waiting candidates may communicate with each other, or may play certain music or advertisements (if wait duration is short).

The exemplary systems and methods of this present invention have been described in relation to a conference bridge. However, to avoid unnecessarily obscuring the present invention, the preceding description omits a number of known structures and devices. This omission is not to be construed as a limitation of the scope of the claimed invention. Specific details are set forth to provide an understanding of the present invention. It should however be appreciated that the present invention may be practiced in a variety of ways beyond the specific detail set forth herein.

Furthermore, while the exemplary embodiments of the present invention illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices, such as a switch, server, and/or adjunct, or collocated on a particular node of a distributed network, such as an analog and/or digital telecommunications network, a packet-switch network, or a circuit-switched network.

It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more conferees' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the present invention.

A number of variations and modifications of the present invention can be used. It would be possible to provide for some features of the present invention without providing others.

For example in one alternative embodiment, the systems and methods of this present invention can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like.

In general, any device(s) or means capable of implementing the methodology illustrated herein can be used to implement the various aspects of this present invention. Exemplary hardware that can be used for the present invention includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment of the present invention, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this present invention is dependent on the speed and/or efficiency requirements of the system, the particular function, and the particular software or hardware systems or microprocessor or microcomputer systems being utilized.

In yet another embodiment of the present invention, the disclosed methods may be partially implemented in software that can be stored on a storage medium, executed on programmed general-purpose computer with the cooperation of a controller and memory, a special purpose computer, a microprocessor, or the like. In these instances, the systems and methods of this present invention can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present invention describes components and functions implemented in the embodiments with reference to particular standards and protocols, the present invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and\or reducing cost of implementation.

The foregoing discussion of the present invention has been presented for purposes of illustration and description. The foregoing is not intended to limit the present invention to the form or forms disclosed herein. In the foregoing Detailed Description for example, various features of the present invention are grouped together in one or more embodiments, configurations, or aspects for the purpose of streamlining the disclosure. The features of the embodiments, configurations, or aspects of the present invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the present invention.

Moreover, though the description of the present invention has included description of one or more embodiments, configurations, or aspects and certain variations and modifications, other variations, combinations, and modifications are within the scope of the present invention, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A conference handling system of an enterprise, the conference handling system comprising:
  a processor coupled to a memory, the processor configured to execute code to:
    use a natural language processing engine to interpret audio of a conference session to determine a presence status of the conference session;
    route a device associated with a conferee into a session comprising an active session and a waiting session, based on the determined presence status of the conference session;
    use the natural language processing engine to interpret audio spoken by conferees of the conference session to determine a contextual status of the active session;
    set the determined contextual status of the active session on a conference bridge; and
    provide services to the device associated with the conferee into the waiting session based on the contextual status of the active session, wherein the services provided include relaying the determined contextual status of the active session from the conference bridge to the device associated with the conferee in the waiting session.

2. The conference handling system of claim 1, wherein the processor is further configured to execute code to route the device associated with the conferee from the waiting session into a new active session after completion of a previous active session.

3. The conference handling system of claim 1, wherein the processor is further configured to execute code to route the conferee into the active session or waiting session based on an identity of the conferee.

4. The conference handling system of claim 1, wherein the processor is further configured to execute code to analyze contextual status of the active session.

5. The conference handling system of claim 1, wherein the contextual status of the active session comprises estimated wait time in completion of the active session.

6. The conference handling system of claim 1, wherein the processor is further configured to execute code to enable the conferee to communicate with other conferees present in the waiting session based on the contextual status of the active session.

7. The conference handling system of claim 1, wherein the services comprise providing media resources to the conferee in the waiting session.

8. The conference handling system of claim 1, wherein the services comprise playing music leased by the conferee in the waiting session.

9. The conference handling system of claim 1, wherein the services comprise pushing web content to the conferee in the waiting session.

10. The conference handling system of claim 1, wherein the services comprise providing overrun alerts corresponding to the active session to the conferee present in the waiting session.

11. The conference handling system of claim 1, wherein the services comprise providing details to the conferee corresponding to estimated time left in completion of the active conference session.

12. The conference handling system of claim 1, wherein the processor is further configured to execute code to add a device associated with a conferee with a specific profile in the waiting session based on absence of a conferee having a similar profile.

13. The conference handling system of claim 12, wherein the processor is further configured to execute code to add a device associated with a conferee with a specific profile in the active session based on absence of a conferee having a similar profile.

14. A computer-implemented method for providing services to waiting conferees in a conference session, the computer-implemented method comprising:
receiving a request from a device associated with a conferee to join a conference session;
using a natural language processing engine, by a processor, to interpret audio of the conference session to determine a presence status of the conference session;
routing the device associated with the conferee into a session comprising an active session and a waiting session, based on the determined presence status of the conference session;
using the natural language processing engine to interpret audio spoken by conferees of the conference session to determine a contextual status of the active session;
setting the determined contextual status of the active session on a conference bridge; and
providing services to the device associated with the conferee into the waiting session based on the contextual status of the active session, wherein the services provided include relaying the determined contextual status of the active session from the conference bridge to the device associated with the conferee in the waiting session.

15. The computer-implemented method of claim 14, wherein the device associated with the conferee is routed into the active session or waiting session based on an identity of the conferee and the status of the conference session.

16. The computer-implemented method of claim 14, further comprising routing the device associated with the conferee from the waiting session into a new active session after completion of a previous active session.

17. The computer-implemented method of claim 14, further comprising enabling the conferees in the waiting session to communicate with each other.

18. The computer-implemented method of claim 14, wherein the services comprising media resources.

19. The computer-implemented method of claim 14, further comprising adding a device associated with a conferee with a specific profile in the active session based on absence of a device associated with a conferee having a similar profile.

20. A non-transitory computer readable medium storing computer readable instructions when executed by a processor perform a method comprising:
receiving a request from a device associated with a conferee to join a conference session;
using a natural language processing engine to interpret audio of the conference session to determine a presence status of the conference session;
routing the device associated with the conferee into a session comprising an active session and a waiting session, based on the determined presence status of the conference session;
using the natural language processing engine to interpret audio spoken by conferees of the conference session to determine a contextual status of the active session;
setting the determined contextual status of the active session on a conference bridge; and
providing services to the device associated with the conferee into the waiting session based on the contextual status of the active session, wherein the services provided include relaying the determined contextual status of the active session from the conference bridge to the device associated with the conferee in the waiting session.

* * * * *